United States Patent
Norman

(10) Patent No.: US 9,481,028 B2
(45) Date of Patent: Nov. 1, 2016

(54) AUTOMATED DRILLING THROUGH PILOT HOLES

(71) Applicant: The Boeing Company, Chicago, IL (US)

(72) Inventor: Nicholas A. Norman, Summerville, SC (US)

(73) Assignee: THE BOEING COMPANY, Chicago, IL (US)

( * ) Notice: Subject to any disclaimer, the term of this patent is extended or adjusted under 35 U.S.C. 154(b) by 367 days.

(21) Appl. No.: 14/037,677

(22) Filed: Sep. 26, 2013

(65) Prior Publication Data

US 2015/0086285 A1    Mar. 26, 2015

(51) Int. Cl.
*B23B 35/00* (2006.01)
*B21J 15/14* (2006.01)
(Continued)

(52) U.S. Cl.
CPC ............... *B21J 15/142* (2013.01); *B21J 15/28* (2013.01); *B23B 35/00* (2013.01); *G05B 19/402* (2013.01); *B23B 2215/04* (2013.01); *B23B 2228/36* (2013.01); *B23B 2270/14* (2013.01); *G05B 2219/37564* (2013.01); *Y10T 408/03* (2015.01); *Y10T 408/21* (2015.01)

(58) Field of Classification Search
CPC . Y10T 408/03; Y10T 408/16; Y10T 408/17; Y10T 408/173; Y10T 408/175; Y10T 408/21; Y10T 408/557; Y10T 408/558; B23B 35/00; B23B 49/00; B23B 2215/04; B23B 2226/27; B23B 2270/48; B23Q 15/22; B23Q 15/24; B23Q 15/26; B23Q 16/00; B23Q 17/00; B23Q 17/22; B23Q 17/2233; B23Q 17/2266; B23Q 17/2275; B23Q 17/24; B23Q 17/2414; B23Q 17/2419; B23Q 17/2428

USPC .............. 408/1 R, 8, 10, 12, 13, 16, 79, 80
See application file for complete search history.

(56) References Cited

U.S. PATENT DOCUMENTS

| | | | | |
|---|---|---|---|---|
| 4,708,545 A | * | 11/1987 | Fujii | B23Q 35/02 408/1 R |
| 5,181,808 A | | 1/1993 | Griggs et al. | |
| 5,275,517 A | * | 1/1994 | Turnipseed | B23B 39/003 144/135.2 |
| 5,741,096 A | * | 4/1998 | Olds | B23Q 17/22 408/1 R |

(Continued)

FOREIGN PATENT DOCUMENTS

| | | | |
|---|---|---|---|
| EP | 0264243 A2 | * | 4/1988 |
| EP | 0669792 A2 | | 8/1995 |

(Continued)

OTHER PUBLICATIONS

Extended European Search Report, dated Feb. 19, 2015, regarding Application No. EP14186250.8, 9 pages.

(Continued)

*Primary Examiner* — Daniel Howell
*Assistant Examiner* — Nicole N Ramos
(74) *Attorney, Agent, or Firm* — Yee & Associates, P.C.

(57) ABSTRACT

A method and apparatus for drilling a hole through a first part and a second part. An image of a first pilot hole in the first part may be generated using an imaging system. A first feature related to the first pilot hole in the first part may be identified based on the image. A second feature related to a second pilot hole in the second part may be identified based on the image. A drilling vector for drilling the hole through the first part and the second part may be identified based on the first feature and the second feature.

22 Claims, 9 Drawing Sheets

(51) Int. Cl.
*B21J 15/28* (2006.01)
*G05B 19/402* (2006.01)

(56) References Cited

U.S. PATENT DOCUMENTS

| | | | |
|---|---|---|---|
| 7,096,555 B2* | 8/2006 | Tourne | H05K 3/0047 174/260 |
| 7,423,734 B1* | 9/2008 | Luik | B23B 31/00 356/141.1 |
| 7,669,321 B1* | 3/2010 | Levy | H05K 1/0268 174/260 |
| 8,272,118 B2 | 9/2012 | Alvez | |
| 2005/0105978 A1* | 5/2005 | Tung | B23Q 17/2233 408/16 |
| 2005/0147477 A1* | 7/2005 | Clark | B23Q 3/183 408/76 |
| 2009/0010726 A1* | 1/2009 | Brugman | B23Q 9/0042 408/1 R |
| 2013/0017027 A1* | 1/2013 | Miller | B23Q 17/0966 408/1 R |
| 2014/0325810 A1 | 11/2014 | Schneider et al. | |

FOREIGN PATENT DOCUMENTS

| | | | |
|---|---|---|---|
| EP | 2116340 A1 | | 11/2009 |
| GB | 1279841 A | * | 6/1972 |
| WO | WO2013053350 A1 | | 4/2013 |

OTHER PUBLICATIONS

Hempstead et al., "Composite Automatic Wing Drilling Equipment (CAWDE)," SAE International, Sep. 2006, 8 pages.

Hogan et al., "Automated Wing Drilling System for the A380-GRAWDE," SAE International, Sep. 2003, 8 pages.

Canadian Intellectual Property Office Examination Search Report, dated Aug. 12, 2015, regarding Application No. 2,860,471, 4 pages.

* cited by examiner

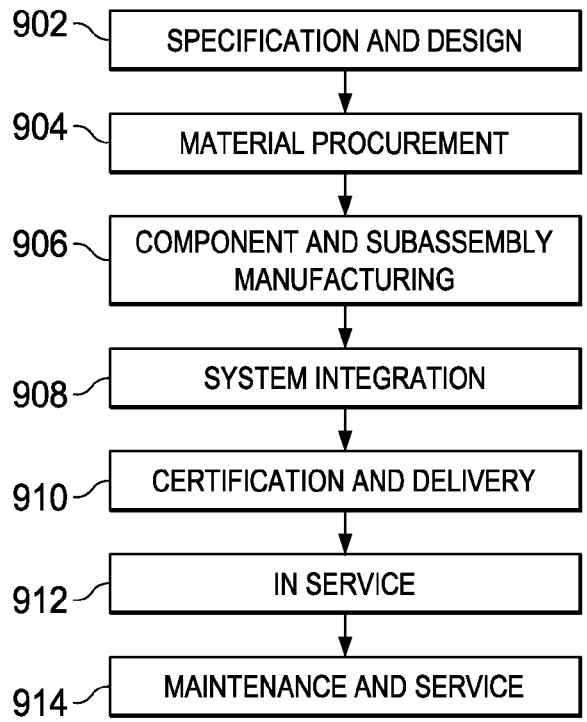
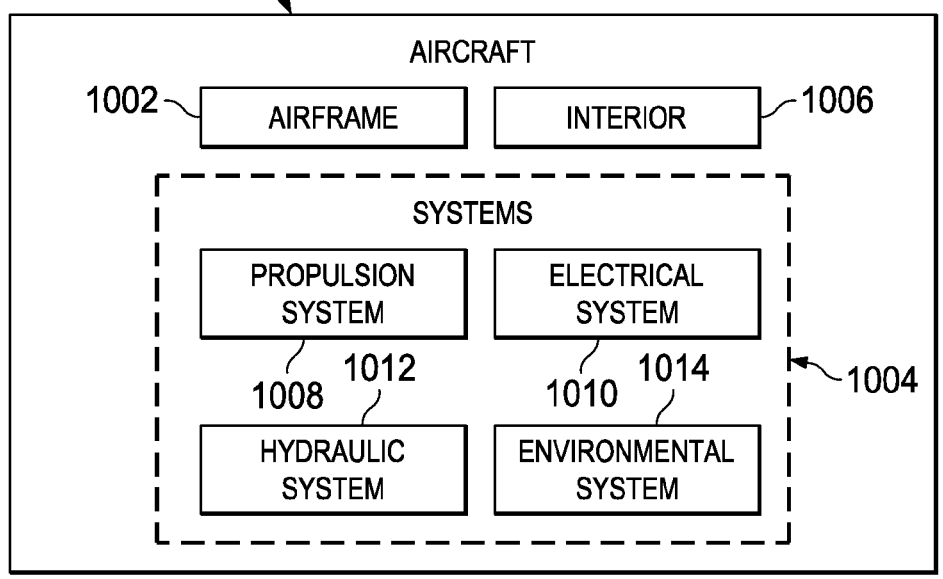

AUTOMATED DRILLING THROUGH PILOT HOLES

BACKGROUND INFORMATION

1. Field

The present disclosure relates generally to drilling and, in particular, to drilling through pilot holes. Still more particularly, the present disclosure relates to a method and apparatus for automating the drilling of a hole in a stackup that overlaps pilot holes through the stackup within selected tolerances.

2. Background

In some manufacturing processes, a first part may be fastened to a second part by temporarily securing the two parts together to form a stackup, drilling a hole through the stackup, and installing a fastener through the hole. As one illustrative example, a first part, such as a skin panel for an aircraft, may be positioned relative to a second part, such as a frame for the aircraft, to form a stackup. In particular, the first part may be positioned relative to the second part such that a first pilot hole in the skin panel is at least partially aligned with a second pilot hole in the frame. The skin panel may be temporarily secured to the frame by inserting a temporary fastener, such as a tack fastener, through the two pilot holes. The tack fastener may reduce or prevent relative movement between the skin panel and the frame during drilling operations.

A drill may be used to drill a hole through the two pilot holes and the tack fastener such that the drilled hole can receive a fastener. The drilled hole may need to completely overlap both the first pilot hole in the skin panel and the second pilot hole in the frame to meet manufacturing requirements. However, with some currently available drilling systems and methods, the drilled hole formed may not completely overlap both pilot holes.

One currently available drilling system may center the drill bit on the center of the exposed end of the tack fastener to position the drill and perform drilling. Positioning the drill bit of the drilling system may be equivalent to positioning the drill column for the drilling system. The drill column may be an imaginary column that represents the hole to be drilled. The drill bit may be positioned at the exposed side of the first part. In this manner, the second pilot hole in the second part may not be visible to the drill. In other words, the second pilot hole may be a "blind hole."

When the drill column is centered on the exposed end of the tack fastener, the hole that is drilled may not completely overlap both pilot holes in both parts. For example, without limitation, the drilled hole may not completely overlap the blind hole. This type of drilled hole may be referred to as a double drilled hole because the blind hole is not completely overlapped and consumed by the drilling process. The diameter of the drilled hole through the second part may be larger than the diameter of the drilled hole through the first part. As a result, this drilled hole may not meet manufacturing requirements or be in conformance.

When a double drilled hole is formed, an operator may need to examine the double drilled hole to determine whether the parts need to be discarded or whether the hole can be made larger to completely overlap the blind hole. A larger fastener may then be installed in the larger hole. However, forming a larger hole may not always be possible given requirements for the edge margins for holes in parts.

When multiple holes are to be drilled into a stackup having tacked pilot holes, automated drilling systems may be unable to drill these holes as quickly and efficiently as desired. An operator may need to manually inspect each hole drilled by the automated system to ensure that the hole is not a double drilled hole. This process may be more time-consuming and labor-intensive than desired and may slow down manufacturing times. Further, the equipment and/or tools needed to currently avoid drilling double drilled holes may be more expensive then desired. Therefore, it would be desirable to have a method and apparatus that take into account at least some of the issues discussed above, as well as other possible issues.

SUMMARY

In one illustrative embodiment, a method may be provided for drilling a hole through a first part and a second part. An image of a first pilot hole in the first part may be generated using an imaging system. A first feature related to the first pilot hole in the first part may be identified based on the image. A second feature related to a second pilot hole in the second part may be identified based on the image. A drilling vector for drilling the hole through the first part and the second part may be identified based on the first feature and the second feature.

In another illustrative embodiment, a method for drilling a hole through a first part and a second part may be provided. A drilling device may be positioned at a preselected drill location over an outer surface of the first part. An image of a first pilot hole in the first part with the drilling device positioned at the preselected drill location may be generated using an imaging system in which a temporary fastener is located within the first pilot hole. A first center of a first end of the temporary fastener exposed at the first pilot hole may be identified as the first feature based on the image. A second center of a second end of the temporary fastener exposed at the second pilot hole may be identified as the second feature based on the image. A line between the first center and the second center may be identified. A drilling point along the line may be identified. The drilling point may be a point on the line that intersects an inner surface of the second part. A vector that contains the drilling point and that is substantially perpendicular to the outer surface of the first part may be identified as the drilling vector. The hole along the drilling vector may be drilled through the first part and the second part such that the hole completely overlaps the first pilot hole and the second pilot hole within selected tolerances.

In yet another illustrative embodiment, an apparatus may comprise a drilling device, an imaging system, and a controller. The drilling device may be configured to drill a hole through a first part having a first pilot hole and a second part having a second pilot hole. The imaging system may be configured to generate an image of the first pilot hole in the first part. The controller may be configured to identify a first feature related to the first pilot hole and a second feature related to the second pilot hole based on the image and to identify a drilling vector along which the hole is to be drilled based on the first feature and the second feature.

In still yet another illustrative embodiment, an automated drilling system may comprise an imaging system, a controller, and a drilling device. The imaging system may be configured to generate an image of a first pilot hole in a first part that is positioned relative to a second part having a second pilot hole. A temporary fastener may be located within the first pilot hole and the second pilot hole. The controller may be configured to identify a first center of the first end of the temporary fastener exposed at the first pilot hole and a second center of a second end of the temporary fastener exposed at the second pilot hole based on the image. The controller may be further configured to identify a line between the first center and the second center. The controller may be further configured to identify a drilling point along the line. The drilling point is a point on the line that intersects an inner surface of the second part. The controller may be further configured to identify a vector that contains the drilling point and that is substantially perpendicular to the outer surface of the first part as a drilling vector. The drilling device may be configured to drill a hole through the first part and the second part along the drilling vector identified such that the hole completely overlaps the first pilot hole in the first part and the second pilot hole in the second part within selected tolerances.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 9 is an illustration of an aircraft manufacturing and service method in the form of a flowchart in accordance with an illustrative embodiment; and FIG. 10 is an illustration of an aircraft in the form of a block diagram in which an illustrative embodiment may be implemented.

DETAILED DESCRIPTION

The illustrative embodiments recognize and take into account different considerations. For example, the illustrative embodiments recognize and take into account that it may be desirable to have an automated drilling system capable of drilling holes that completely overlap pilot holes in a stackup of parts within selected tolerances.

Figure 1:
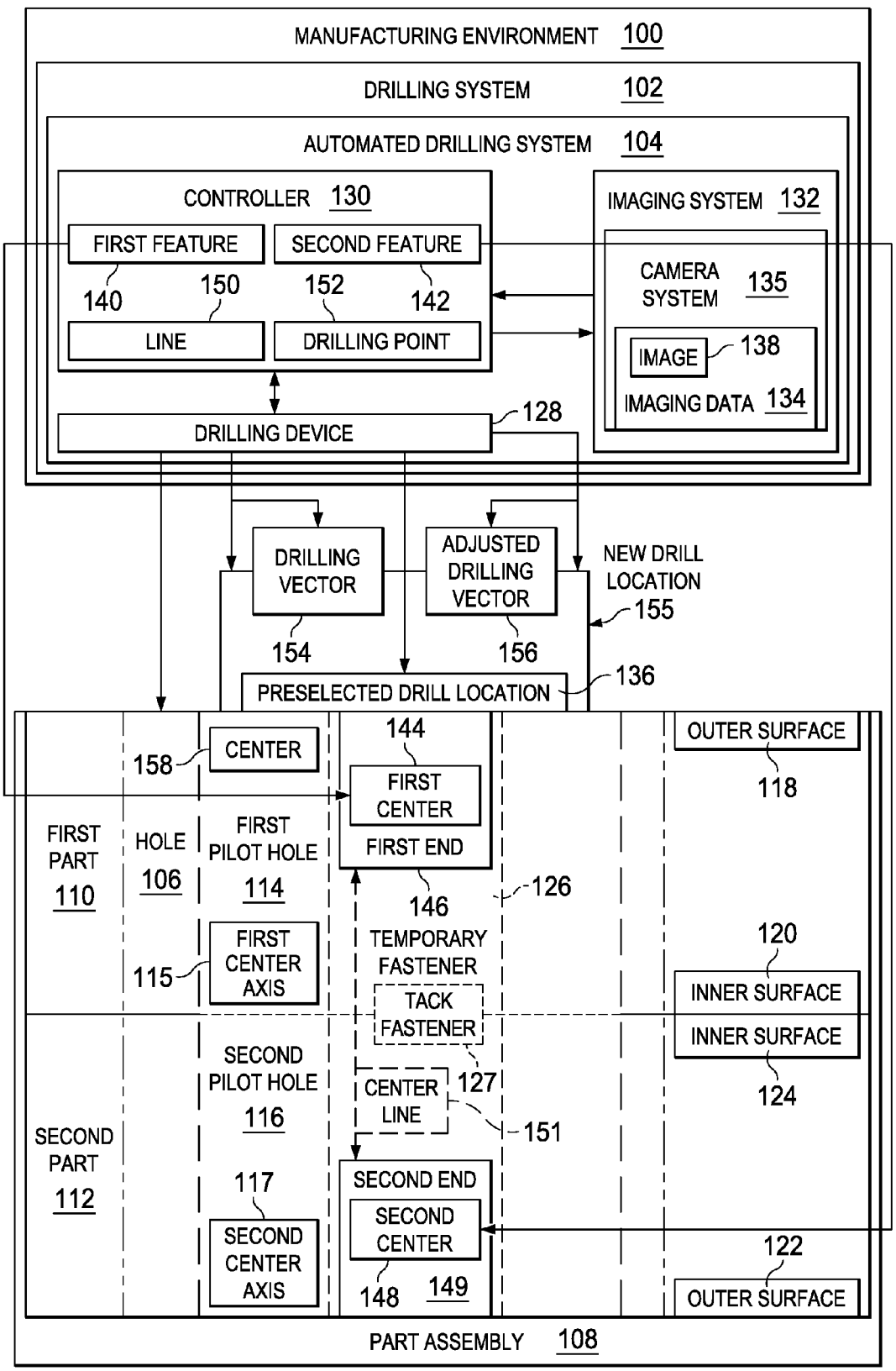
FIG. 1 is an illustration of a manufacturing environment in the form of a block diagram in accordance with an illustrative embodiment.

Referring now to the figures and, in particular, with reference to FIG. 1, an illustration of a manufacturing environment is depicted in the form of a block diagram in accordance with an illustrative embodiment. Manufacturing environment 100 may be an example of an environment in which drilling system 102 may be used. Drilling system 102 may take the form of automated drilling system 104 in this illustrative example.

Drilling system 102 may be used to drill hole 106 through part assembly 108. Part assembly 108 may be comprised of at least two parts. In one illustrative example, part assembly 108 may include first part 110 and second part 112. First part 110 and second part 112 may take a number of different forms. In one illustrative example, first part 110 may be a first panel and second part 112 may be a second panel. In another illustrative example, first part 110 may be a skin panel and second part 112 may be a structure in a frame.

First part 110 and second part 112 may be positioned relative to each other such that first part 110 is stacked over second part 112. In this manner, part assembly 108 may take the form of a stackup of parts in this example.

As depicted, first part 110 may have first pilot hole 114 and second part 112 may have second pilot hole 116. First pilot hole 114 may extend from outer surface 118 of first part 110 to inner surface 120 of first part 110. Second pilot hole 116 may extend from outer surface 122 of second part 112 to inner surface 124 of second part 112. As depicted, inner surface 120 of first part 110 and inner surface 124 of second part 112 may be the surfaces of these parts that are in contact with each other. In some cases, outer surface 118 of first part 110 may form the outer mold line (OML) for part assembly 108. Further, inner surface 120 of first part 110 and/or inner surface 124 of second part 112 may form the inner mold line (IML) for part assembly 108.

In this illustrative example, temporary fastener 126 may be inserted through first pilot hole 114 and second pilot hole 116 to temporarily secure first part 110 to second part 112. Temporary fastener 126 may prevent relative movement between first part 110 and second part 112 during drilling of hole 106 through first part 110 and second part 112. During the drilling of hole 106, temporary fastener 126 may be consumed.

Temporary fastener 126 may be implemented using, for example, without limitation, tack fastener 127. Tack fastener 127 may also be referred to simply as a tack, in some cases. Temporary fastener 126 may have a substantially constant diameter that is smaller than the diameters of first pilot hole 114 and second pilot hole 116.

Drilling system 102 may be configured to drill hole 106 through part assembly 108 such that hole 106 substantially overlaps both first pilot hole 114 and second pilot hole 116 within selected tolerances. As depicted, drilling system 102 may include drilling device 128, controller 130, and imaging system 132.

In this illustrative example, drilling device 128 may be the device used to drill hole 106. Controller 130 may be used to control operation of drilling device 128 based on imaging data 134 received from imaging system 132. Imaging system 132 may take the form of, for example, without limitation, camera system 135. Controller 130 may be implemented using hardware, software, or a combination of the two. In one illustrative example, controller 130 may be implemented using a computer system comprised of one or more computers. These computers may be associated with drilling device 128 or located remotely with respect to drilling device 128.

As used herein, when one component is "associated" with another component, the association is a physical association in the depicted examples. For example, a first component, such as a computer, may be considered to be associated with a second component, such as drilling device 128, by being secured to the second component, bonded to the second component, mounted to the second component, welded to the second component, fastened to the second component, and/or connected to the second component in some other suitable manner. The first component also may be connected to the second component using a third component. Further, the first component may be considered to be associated with the second component by being formed as part of and/or as an extension of the second component.

In some illustrative examples, first pilot hole 114 may not be concentrically aligned with second pilot hole 116. In other words, first center axis 115 through first pilot hole 114 may not be second center axis 117 through second pilot hole 116. This misalignment may be due to first part 110 and/or second part 112 shifting. First part 110 and/or second part 112 may shift due to the diameter of temporary fastener 126 being smaller than the diameters of first pilot hole 114 and second pilot hole 116. In other examples, the misalignment may be due to the manner in which first part 110 is stacked relative to second part 112.

Drilling system 102 may need to be positioned and oriented such that drilling device 128 forms hole 106 that overlaps both of these pilot holes even when they are not aligned. In this illustrative example, drilling system 102 may be configured to begin drilling hole 106 at outer surface 116 of first part 110. Drilling device 128 may be moved to preselected drill location 136 over first part 110. Imaging system 132 may generate imaging data 134 in the form of, for example, without limitation, image 138 with drilling device 128 positioned at preselected drill location 136. Image 138 may capture outer surface 118 of first part 110 with first pilot hole 114 and temporary fastener 126.

Controller 130 may use image 138 to identify first feature 140 related to first pilot hole 114 and second feature 142 related to second pilot hole 116. In one illustrative example, first feature 140 may be first center 144. First center 144 may be the center of first end 146 of temporary fastener 126 exposed to drilling device 128. In this illustrative example, second feature 142 may be second center 148. Second center 148 may be the center of second end 149 of temporary fastener 126 not in the view of drilling device 128. First center 144 and second center 148 may be identified in three coordinates, X, Y, and Z.

Second center 148 may be identified in a number of different ways. In one illustrative example, image 138 may be used to determine an angle of temporary fastener 126 relative to part assembly 108. When first pilot hole 114 and second pilot hole 116 are not concentrically aligned, temporary fastener 126 may be angled relative to outer surface 118 of first part 110 at some angle other than about 90 degrees. In other words, when first pilot hole 114 and second pilot hole 116 are not concentrically aligned, temporary fastener 126 may not be substantially perpendicular to outer surface 118 of first part 110.

In one illustrative example, shadowing and/or other features in image 138 may be used to determine the angle of temporary fastener 126 relative to part assembly 108. Based on this angle and a known length of temporary fastener 126, second center 148 may be identified.

Controller 130 may identify line 150 formed by first feature 140 and second feature 142. Line 150 may be the line formed by connecting first feature 140 and second feature 142. When first feature 140 and second feature 142 take the form of first center 144 of first end 146 of tack fastener 127 and second center 146 of second end 148 of tack fastener 127, respectively, line 150 may be centerline 151 through tack fastener 127. Centerline 151 may also be referred to as a center or central axis in some cases.

Controller 130 may then identify drilling point 152 on line 150. Drilling point 152 may be the point on line 150 that intersects the inner mold line for part assembly 108. For example, without limitation, drilling point 152 may be the point on line 150 that intersects inner surface 124 of second part 112.

Controller 130 may identify drilling point 152 based on the known thickness of first part 110 between outer surface 118 and inner surface 120 and the known thickness of second part 112 between outer surface 122 and inner surface 124.

Based on drilling point 152, controller 130 may then identify drilling vector 154 and new drill location 155. Drilling vector 154 may be the vector substantially perpendicular to outer surface 118 of first part 110 that contains drilling point 152. New drill location 155 may be the new location over outer surface 118 of first part 110 at which drilling device 128 is to be positioned.

Controller 130 may control operation of drilling device 128 such that drilling device 128 drills into part assembly 108 along drilling vector 154 at new drill location 155. Drilling along drilling vector 154 may result in hole 106 being formed in which drilling vector 154 forms the center axis of hole 106.

In some illustrative examples, drilling hole 106 along drilling vector 154 at new drill location 155 may not result in both first pilot hole 114 and second pilot hole 116 being completely overlapped and/or temporary fastener 126 being fully consumed by the drilling process. In these examples, controller 130 may adjust the angle of drilling vector 154 prior to drilling to form adjusted drilling vector 156. In particular, adjusted drilling vector 156 may be offset from drilling vector 154 within some selected range of degrees. For example, without limitation, adjusted drilling vector 156 may be offset from drilling vector 154 by up to about 2 degrees towards the angle at which temporary fastener 126 lies relative to outer surface 118 of first part 110. Adjusting the angle of drilling vector 154 may also change new drill location 155.

In this manner, using imaging system 132, controller 130 may control drilling device 128 such that hole 106 is drilled in a manner that completely overlaps first pilot hole 114 and second pilot hole 116 and completely consumes temporary fastener 126 within selected tolerances. Although first feature 140 and second feature 142 have been described as being first center 144 and second center 148, first feature 140 and second feature 142 may be identified differently in other illustrative examples.

For example, without limitation, center 158 of first pilot hole 114 may be identified as first feature 140 instead of first center 144 of first end 146. Further, in some cases, second feature 142 may be identified as some point at second end 149 of temporary fastener 126 other than second center 148.

The illustration of manufacturing environment 100 in FIG. 1 is not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

Figure 2:
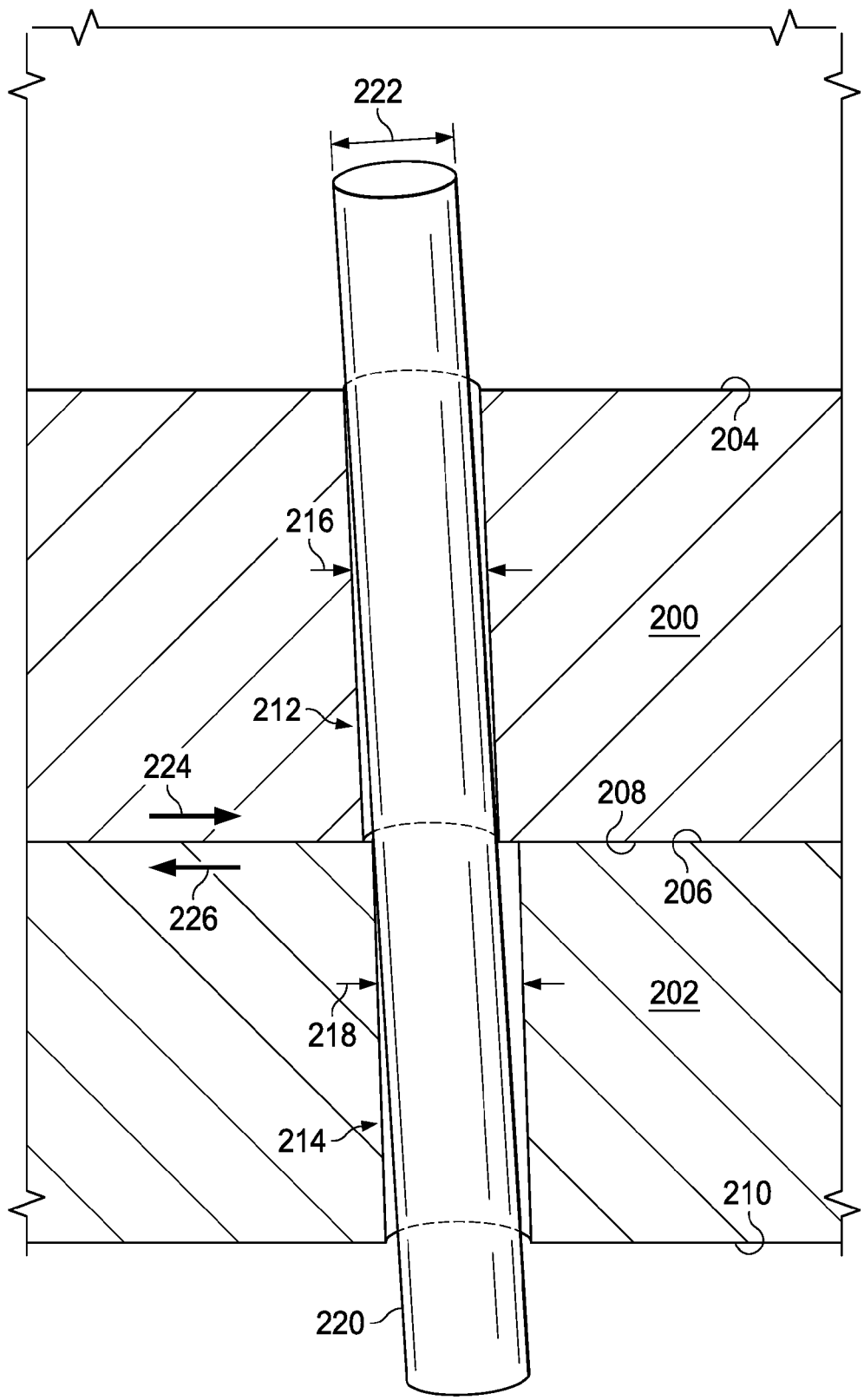
FIG. 2 is an illustration of two parts temporarily secured together in accordance with an illustrative embodiment.

With reference now to FIG. 2, an illustration of two parts temporarily secured together is depicted in accordance with an illustrative embodiment. In this illustrative example, first part 200 and second part 202 are depicted stacked together. First part 200 may have outer surface 204 and inner surface 206. Second part 202 may have inner surface 208 and outer surface 210.

As depicted, first pilot hole 212 may be present in first part 200 and second pilot hole 214 may be present in second part 202. First pilot hole 212 may have diameter 216, while second pilot hole 214 may have diameter 218. Diameter 216 and diameter 218 may be substantially equal in this illustrative example. Of course, in other illustrative examples, diameter 216 may be larger than or smaller than diameter 218.

First pilot hole 212 and second pilot hole 214 may not be concentrically aligned in this illustrative example. However, tack fastener 220 has been inserted through both first pilot hole 212 and second pilot hole 214. Tack fastener 220 may have diameter 222. Diameter 222 may be smaller than diameter 216 and diameter 218. As a result, first part 200 and/or second part 202 may be configured to shift in the direction of arrow 224 and/or the direction of arrow 226 relative to each other.

Figure 3:
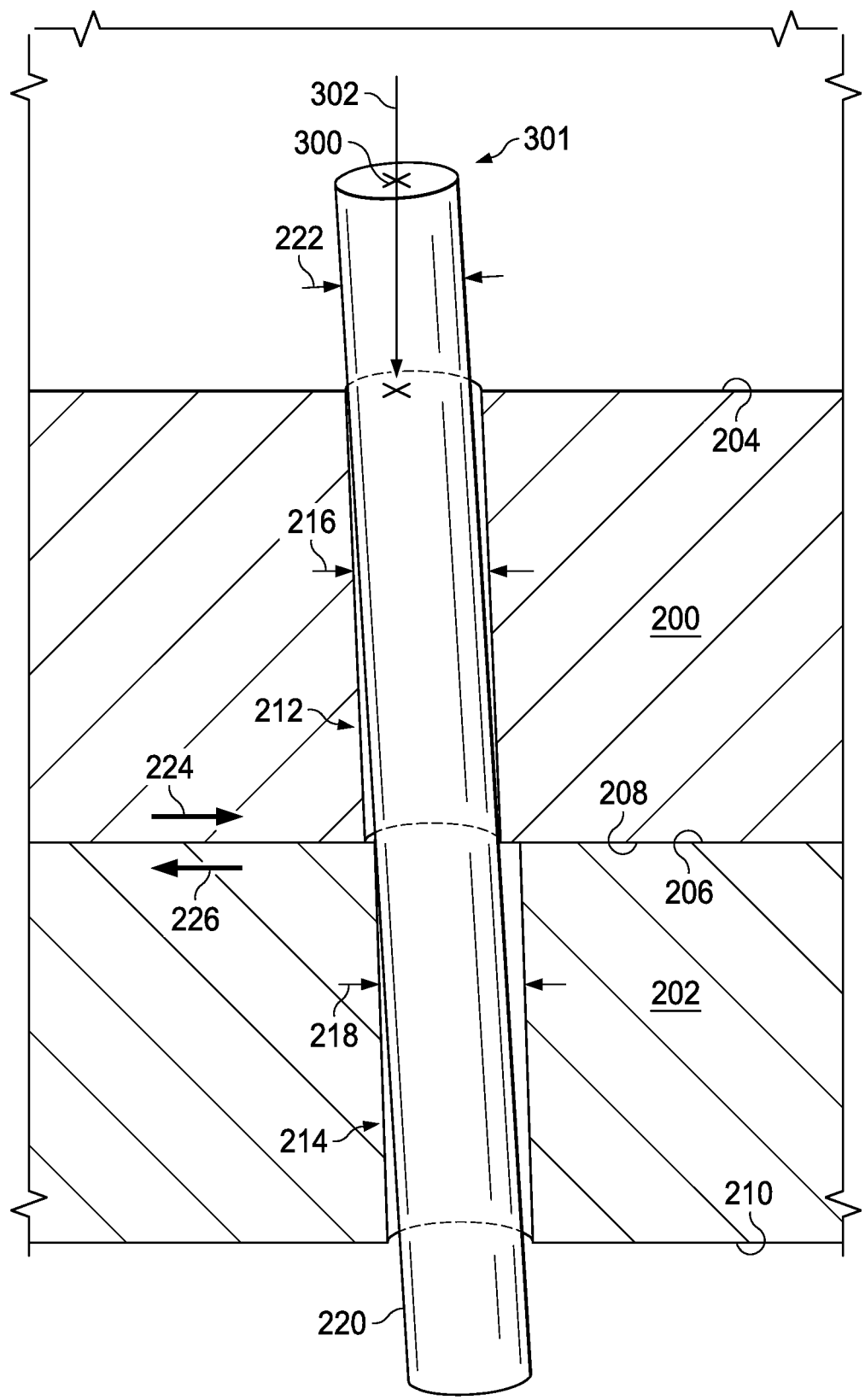
FIG. 3 is an illustration of a first feature identified for drilling a hole in accordance with an illustrative embodiment.

Turning now to FIG. 3, an illustration of a first feature identified for drilling a hole is depicted in accordance with an illustrative embodiment. In this illustrative example, first feature 300 has been identified. First feature 300 is the center of first end 301 of tack fastener 220.

As depicted, drilling vector 302 may be formed. Drilling vector 302 may be the vector that is substantially perpendicular to outer surface 204 of first part 200 and that contains first feature 300. However, when only using first feature 300 to form drilling vector 302, the hole (not shown) formed by drilling along drilling vector 302 may not completely overlap both first pilot hole 212 and second pilot hole 214.

Figure 4:
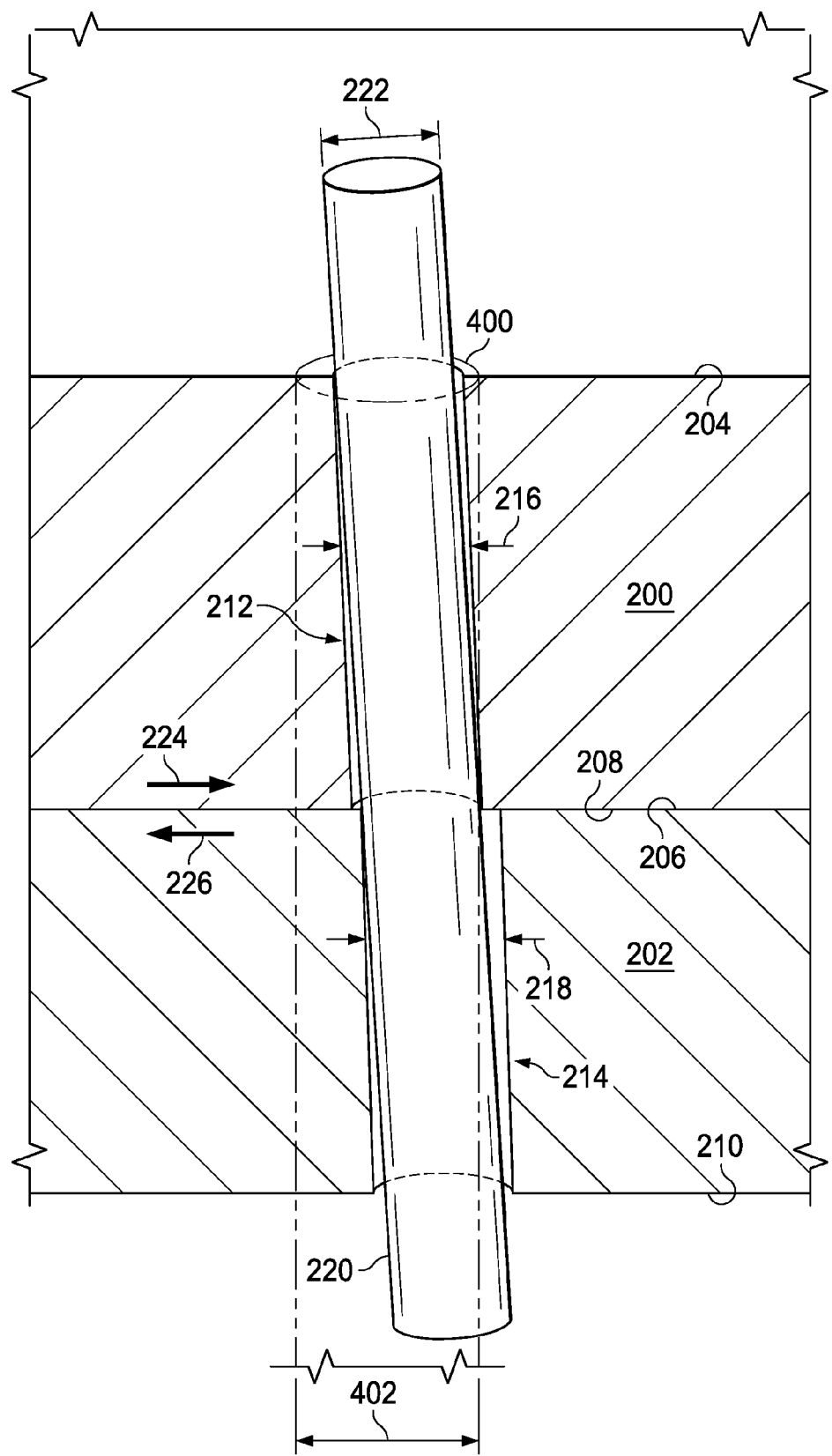
FIG. 4 is an illustration of a drill column formed along a drilling vector in accordance with an illustrative embodiment.

With reference now to FIG. 4, an illustration of a drill column formed along drilling vector 302 from FIG. 3 is depicted in accordance with an illustrative embodiment. In this illustrative example, drill column 400 may represent the hole that may be drilled through first part 200 and second part 202 when drilling vector 302 is used. Drill column 400 may have diameter 402. As depicted, drill column 400 does not completely overlap both first pilot hole 212 and second pilot hole 214. Consequently, a second feature may need to be identified for use in forming a drilling vector.

Figure 5:
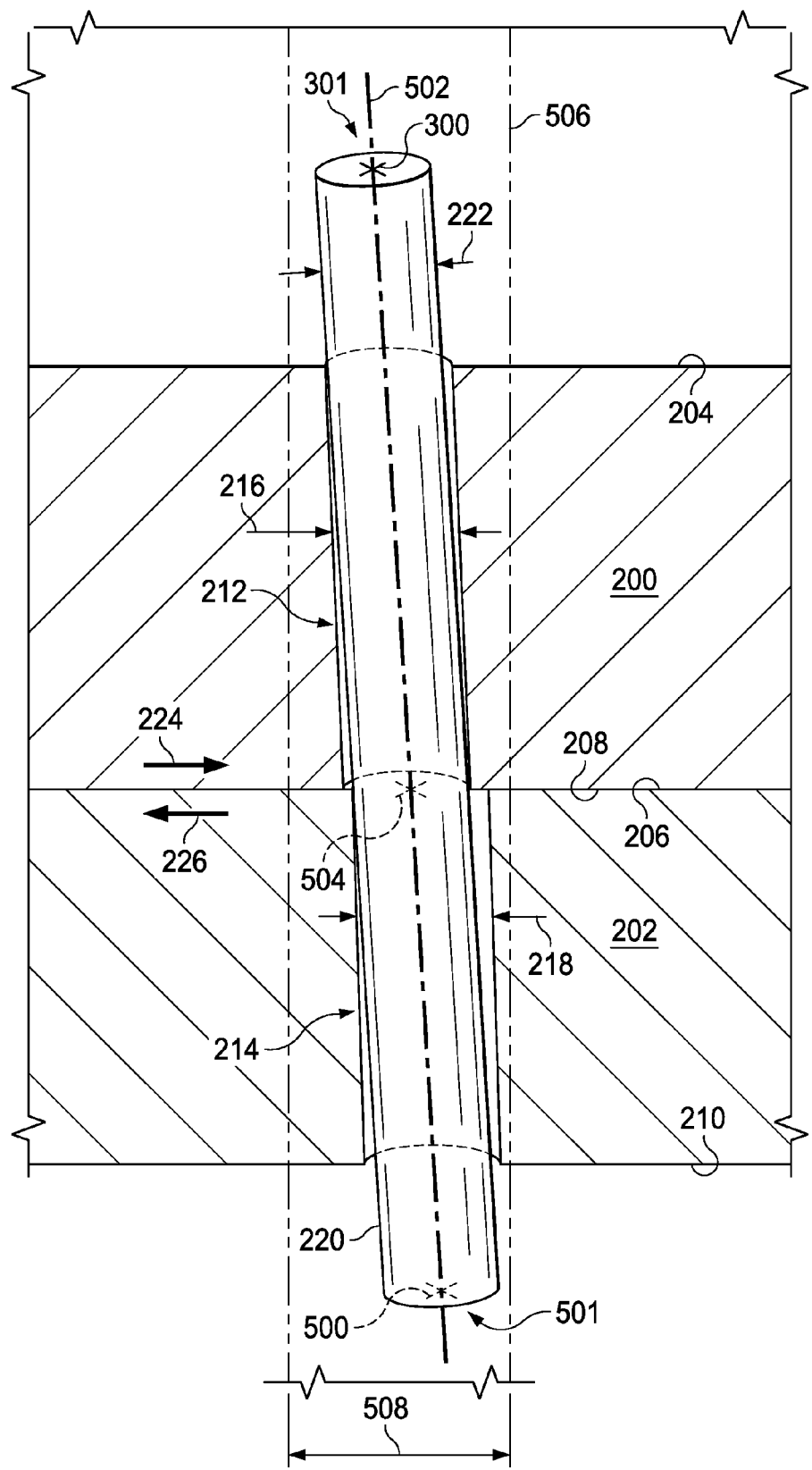
FIG. 5 is an illustration of a drill column formed based on a drilling vector identified using two features in accordance with an illustrative embodiment.

Turning now to FIG. 5, an illustration of a drill column formed based on a drilling vector identified using two features is depicted in accordance with an illustrative embodiment. In this illustrative example, second feature 500 has been identified in addition to first feature 300. Second feature 500 may be the center of second end 501 of tack fastener 220. In particular, second feature 500 may be the center of a cross-section of tack fastener 220 substantially perpendicular to centerline 502 through tack fastener 220.

In this illustrative example, first feature 300 and second feature 500 may be used to identify centerline 502 through tack fastener 220. In particular, the line formed by connecting first feature 300 and second feature 500 may be identified as centerline 502. Centerline 502 may be an example of one implementation for both line 150 and centerline 151 in FIG. 1.

Centerline 502 may be used to identify drilling point 504. Drilling point 504 may be the point along centerline 502 that intersects inner surface 208 of second part 202. Drill column 506 may represent the hole that will be drilled along the drilling vector that contains drilling point 504 and that is formed substantially perpendicular to outer surface 204. Drill column 506 may have diameter 508. As depicted, drill column 506 completely overlaps both first pilot hole 212 and second pilot hole 214.

Figure 6:
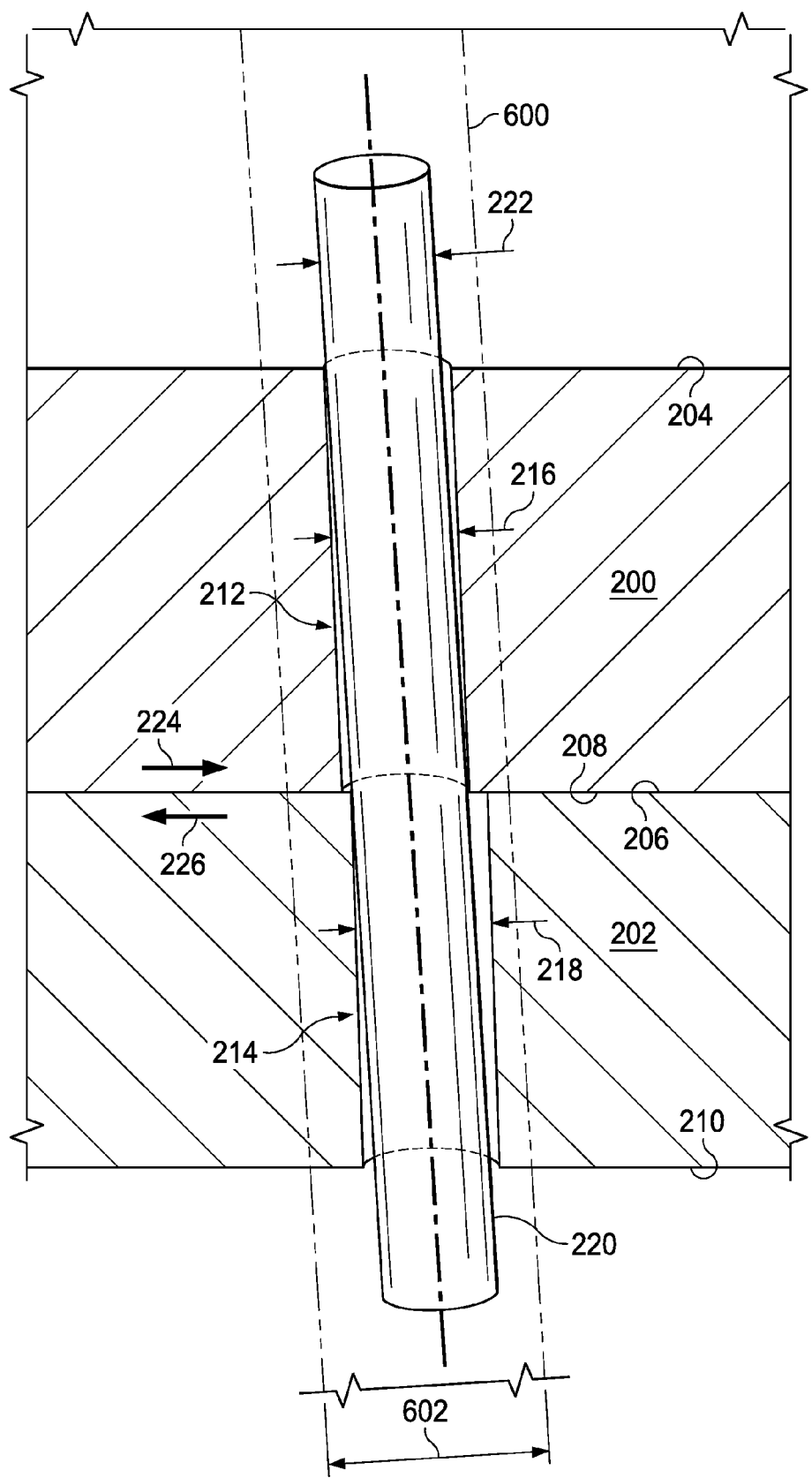
FIG. 6 is an illustration of an adjusted drill column in accordance with an illustrative embodiment.

With reference now to FIG. 6, an illustration of an adjusted drill column is depicted in accordance with an illustrative embodiment. In this illustrative example, adjusted drill column 600 may represent the hole that will be drilled. Drill column 600 may have diameter 602. As depicted, adjusted drill column 600 has been angled at an offset relative to drill column 506 in FIG. 5 by about 2 degrees.

This angling may be performed to better ensure that the hole that will be formed will completely overlap both first pilot hole 212 and second pilot hole 214. In this illustrative example, adjusted drill column 600 may be angled towards the angle at which tack fastener 220 is oriented.

The illustrations in FIGS. 2-6 are not meant to imply physical or architectural limitations to the manner in which an illustrative embodiment may be implemented. Other components in addition to or in place of the ones illustrated may be used. Some components may be optional.

The different components shown in FIGS. 2-6 may be illustrative examples of how components shown in block form in FIG. 1 can be implemented as physical structures. Additionally, some of the components in FIGS. 2-6 may be combined with components in FIG. 1, used with components in FIG. 1, or a combination of the two.

Figure 7:
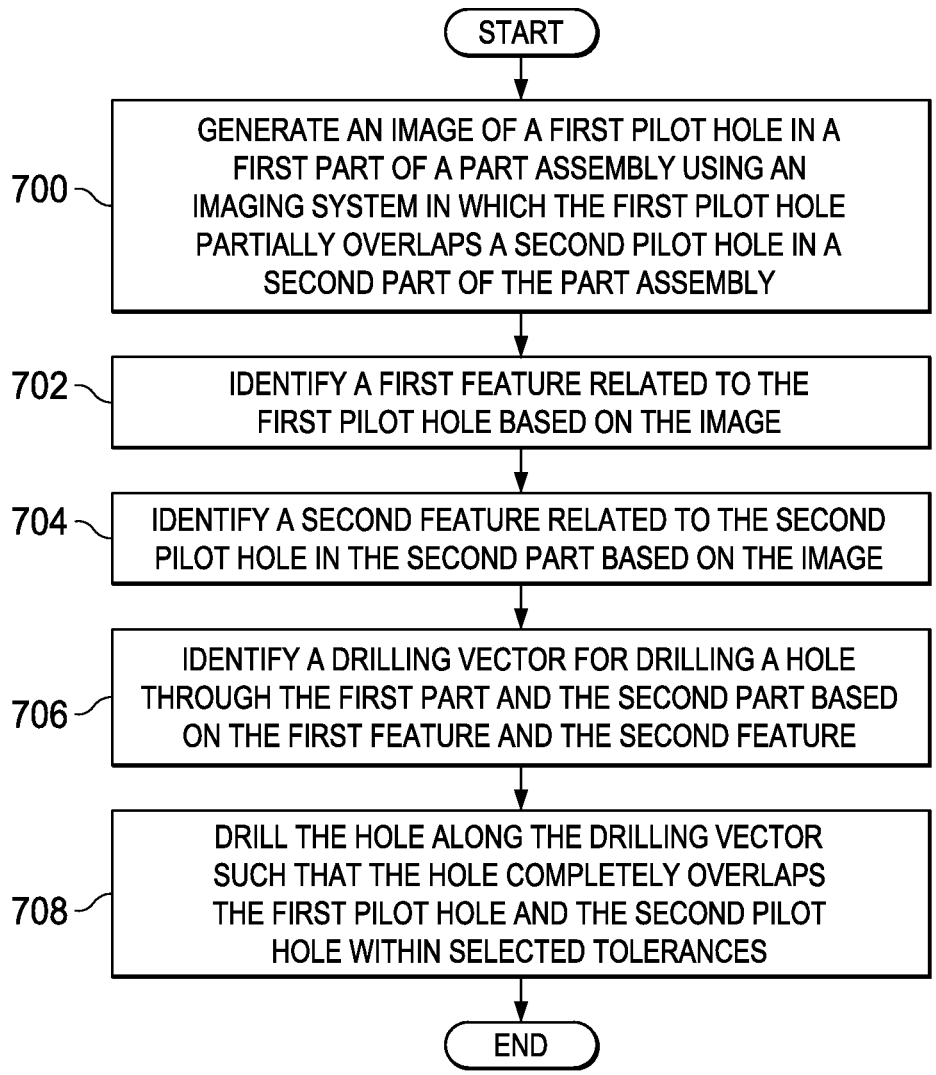
FIG. 7 is an illustration of a process for drilling a hole through a first part and a second part in the form of a flowchart in accordance with an illustrative embodiment.

With reference now to FIG. 7, an illustration of a process for drilling a hole through a first part and a second part is depicted in the form of a flowchart in accordance with an illustrative embodiment. The process illustrated in FIG. 7 may be implemented using drilling system 102 in FIG. 1.

The process may begin by generating image 138 of first pilot hole 114 in first part 110 of part assembly 108 using imaging system 132 in which first pilot hole 114 partially overlaps second pilot hole 116 in second part 112 of part assembly 108 (operation 700). First feature 140 related to first pilot hole 114 may be identified based on image 138 (operation 702). Second feature 142 related to second pilot hole 116 in second part 112 may be identified based on image 138 (operation 704).

Thereafter, drilling vector 154 for drilling hole 106 through first part 110 and second part 112 may be identified based on first feature 140 and second feature 142 (operation 706). Next, hole 106 may be drilled along drilling vector 154 such that hole 106 completely overlaps first pilot hole 114 and second pilot hole 116 within selected tolerances (operation 708), with the process terminating thereafter.

Figure 8:
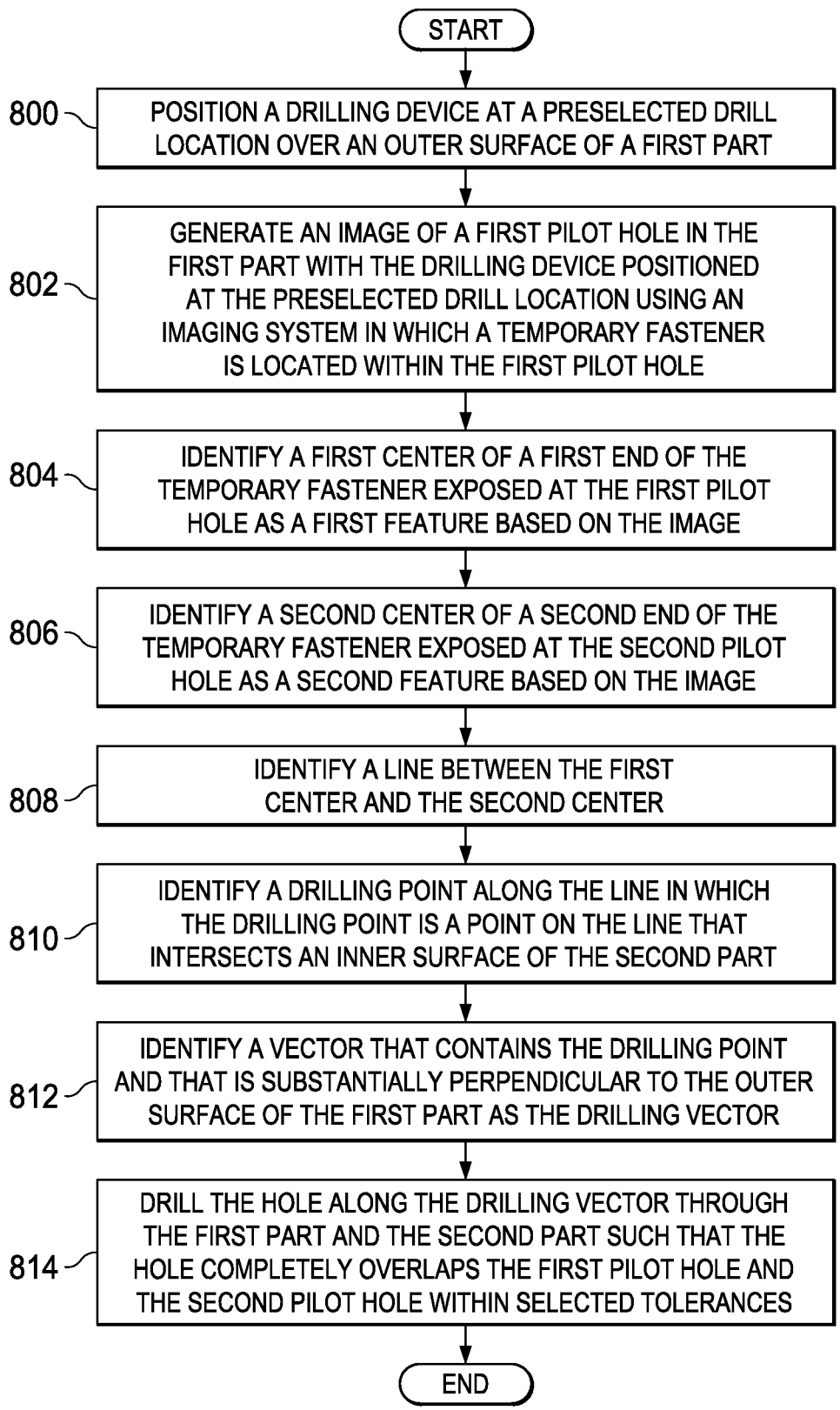
FIG. 8 is an illustration of a process for drilling a hole through a first part and a second part in the form of a flowchart in accordance with an illustrative embodiment.

With reference now to FIG. 8, an illustration of a process for drilling a hole through a first part and a second part is depicted in the form of a flowchart in accordance with an illustrative embodiment. The process illustrated in FIG. 8 may be implemented using drilling system 102 in FIG. 1.

The process may begin by positioning drilling device 128 at preselected drill location 136 over outer surface 118 of first part 110 (operation 800). Image 138 of first pilot hole 114 in first part 110 may be generated with drilling device 128 positioned at preselected drill location 136 using imaging system 132 in which temporary fastener 126 is located within first pilot hole 114 (operation 802). First center 144 of first end 146 of temporary fastener 126 exposed at first pilot hole 114 as first feature 140 may be identified based on image 138 (operation 804). Second center 148 of second end 149 of temporary fastener 126 exposed at second pilot hole 116 as second feature 142 may be identified based on image 138 (operation 806).

Line 150 between first center 144 and second center 148 may be identified (operation 808). Drilling point 152 along line 150 may be identified in which drilling point 152 is a point on line 150 that intersects inner surface 124 of second part 112 (operation 810). A vector that contains drilling point 152 and that is substantially perpendicular to outer surface 118 of first part 110 may be identified as drilling vector 154 (operation 812). Hole 106 may be drilled along drilling vector 154 through first part 110 and second part 112 such that hole 106 completely overlaps first pilot hole 114 and second pilot hole 116 within selected tolerances (operation 814), with the process terminating thereafter.

Illustrative embodiments of the disclosure may be described in the context of aircraft manufacturing and service method 900 as shown in FIG. 9 and aircraft 1000 as shown in FIG. 10. Turning first to FIG. 9, an illustration of an aircraft manufacturing and service method is depicted in the form of a flowchart in accordance with an illustrative embodiment. During pre-production, aircraft manufacturing and service method 900 may include specification and design 902 of aircraft 1000 in FIG. 10 and material procurement 904.

During production, component and subassembly manufacturing 906 and system integration 908 of aircraft 1000 in FIG. 10 takes place. Thereafter, aircraft 1000 in FIG. 10 may go through certification and delivery 910 in order to be placed in service 912. While in service 912 by a customer, aircraft 1000 in FIG. 10 is scheduled for routine maintenance and service 914, which may include modification, reconfiguration, refurbishment, and other maintenance or service.

Each of the processes of aircraft manufacturing and service method 900 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 10, an illustration of an aircraft is depicted in the form of a block diagram in which an illustrative embodiment may be implemented. In this example, aircraft 1000 is produced by aircraft manufacturing and service method 900 in FIG. 9 and may include airframe 1002 with plurality of systems 1004 and interior 1006. Examples of systems 1004 include one or more of propulsion system 1008, electrical system 1010, hydraulic system 1012, and environmental system 1014. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 900 in FIG. 9. In particular, drilling system 102 from FIG. 1 may be used to drill holes into one or more structures of aircraft 1000 during any one of the stages of aircraft manufacturing and service method 900. For example, without limitation, drilling system 102 from FIG. 1 may be used to drill holes during at least one of component and subassembly manufacturing 906, system integration 908, routine maintenance and service 914, or some other stage of aircraft manufacturing and service method 900. Further, drilling system 102 may be used to drill holes in one or more structures of aircraft 1000, such as airframe 1002.

In one illustrative example, components or subassemblies produced in component and subassembly manufacturing 906 in FIG. 9 may be fabricated or manufactured in a manner similar to components or subassemblies produced while aircraft 1000 is in service 912 in FIG. 9. As yet another example, one or more apparatus embodiments, method embodiments, or a combination thereof may be utilized during production stages, such as component and subassembly manufacturing 906 and system integration 908 in FIG. 9. One or more apparatus embodiments, method embodiments, or a combination thereof may be utilized while aircraft 1000 is in service 912 and/or during maintenance and service 914 in FIG. 9. The use of a number of the different illustrative embodiments may substantially expedite the assembly of and/or reduce the cost of aircraft 1000.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for drilling a hole through a first part and a second part, the method comprising:
    generating an image of a first pilot hole in the first part using an imaging system;
    identifying a first feature related to the first pilot hole in the first part based on the image;
    identifying a second feature related to a second pilot hole in the second part based on the image; and
    identifying a drilling vector for drilling the hole through the first part and the second part based on the first feature and the second feature.

2. The method of claim 1 further comprising:
    drilling the hole along the drilling vector through the first part and the second part such that the hole completely overlaps the first pilot hole and the second pilot hole within selected tolerances.

3. The method of claim 1, wherein generating the image of the first pilot hole in the first part using the imaging system comprises:
generating the image of the first pilot hole in the first part having a temporary fastener located within the first pilot hole using the imaging system.

4. The method of claim 3, wherein identifying the first feature related to the first pilot hole based on the image comprises:
identifying a first center of a first end of the temporary fastener exposed at the first pilot hole as the first feature based on the image.

5. The method of claim 4, wherein identifying the second feature related to the second pilot hole in the second part based on the image comprises:
identifying a second center of a second end of the temporary fastener exposed at the second pilot hole as the second feature based on the image.

6. The method of claim 5, wherein identifying the second center of the second end of the temporary fastener as the second feature based on the image comprises:
identifying an angle of the temporary fastener relative to an outer surface of the first part based on the image and a known length of the temporary fastener; and
identifying the second center of the second end of the temporary fastener exposed at the second pilot hole based on the first center identified and the angle identified.

7. The method of claim 5, wherein identifying the drilling vector for drilling the hole through the first part and the second part based on the first feature and the second feature comprises:
identifying a line between the first center and the second center;
identifying a drilling point along the line in which the drilling point is a point on the line that intersects an inner surface of the second part; and
identifying a vector that contains the drilling point and that is substantially perpendicular to an outer surface of the first part as the drilling vector.

8. The method of claim 1 further comprising:
adjusting an angle of the drilling vector relative to an outer surface of the first part such that the hole to be drilled along the drilling vector will completely overlap the first pilot hole and the second pilot hole.

9. The method of claim 1, wherein generating the image of the first pilot hole in the first part using the imaging system comprises:
positioning a drilling device at a preselected drill location over an outer surface of the first part; and
generating the image of the first pilot hole in the first part with the drilling device positioned at the preselected drill location using the imaging system.

10. A method for drilling a hole through a first part and a second part, the method comprising:
positioning a drilling device at a preselected drill location over an outer surface of the first part;
generating an image of a first pilot hole in the first part with the drilling device positioned at the preselected drill location using an imaging system in which a temporary fastener is located within the first pilot hole;
identifying a first center of a first end of the temporary fastener exposed at the first pilot hole as a first feature based on the image;
identifying a second center of a second end of the temporary fastener exposed at a second pilot hole as a second feature based on the image;
identifying a line between the first center and the second center;
identifying a drilling point along the line in which the drilling point is a point on the line that intersects an inner surface of the second part;
identifying a vector that contains the drilling point and that is substantially perpendicular to the outer surface of the first part as the drilling vector; and
drilling the hole along the drilling vector through the first part and the second part such that the hole completely overlaps the first pilot hole and the second pilot hole within selected tolerances.

11. An apparatus comprising:
a drilling device configured to drill a hole through a first part having a first pilot hole and a second part having a second pilot hole;
an imaging system configured to generate an image of the first pilot hole in the first part; and
a controller configured to identify a first feature related to the first pilot hole and a second feature related to the second pilot hole based on the image and to identify a drilling vector along which the hole is to be drilled based on the first feature and the second feature.

12. The apparatus of claim 11, wherein the drilling device is configured to drill the hole along the drilling vector identified such that the hole completely overlaps the first pilot hole and the second pilot hole within selected tolerances.

13. The apparatus of claim 11, wherein the image captures the first pilot hole in the first part and a temporary fastener located within the first pilot hole.

14. The apparatus of claim 13, wherein the temporary fastener is a tack fastener.

15. The apparatus of claim 13, wherein the first feature related to the first pilot hole is a first center of a first end of the temporary fastener exposed at the first pilot hole.

16. The apparatus of claim 15, wherein the second feature related to the second pilot hole is a second center of a second end of the temporary fastener exposed at the second pilot hole.

17. The apparatus of claim 16, wherein the controller is configured to identify an angle of the temporary fastener relative to an outer surface of the first part based on the image and a known length of the temporary fastener and to identify the second center of the second end of the temporary fastener exposed at the second pilot hole based on the first center identified and the angle identified.

18. The apparatus of claim 17, wherein the controller is configured to identify a line between the first center and the second center, identify a drilling point along the line in which the drilling point is a point on the line that intersects an inner surface of the second part, and to identify a vector that contains the drilling point and that is substantially perpendicular to the outer surface of the first part as the drilling vector.

19. The apparatus of claim 11, wherein the controller is further configured to adjust an angle of the drilling vector relative to an outer surface of the first part such that the hole to be drilled along the drilling vector will completely overlap the first pilot hole and the second pilot hole.

20. The apparatus of claim 11, wherein the imaging system is a camera system.

21. The apparatus of claim 11, wherein the first part is a skin panel for an aircraft and the second part is a structure in a frame for the aircraft.

22. An automated drilling system comprising:
- an imaging system configured to generate an image of a first pilot hole in a first part that is positioned relative to a second part having a second pilot hole in which a temporary fastener is located within the first pilot hole and the second pilot hole;
- a controller configured to identify a first center of a first end of the temporary fastener exposed at the first pilot hole and a second center of a second end of the temporary fastener exposed at the second pilot hole based on the image; identify a line between the first center and the second center; identify a drilling point along the line in which the drilling point is a point on the line that intersects an inner surface of the second part; and identify a vector that contains the drilling point and that is substantially perpendicular to an outer surface of the first part as a drilling vector; and
- a drilling device configured to drill a hole through the first part and the second part along the drilling vector identified such that the hole completely overlaps the first pilot hole in the first part and the second pilot hole in the second part within selected tolerances.

\* \* \* \* \*